(12) United States Patent
Ko

(10) Patent No.: US 11,185,992 B2
(45) Date of Patent: Nov. 30, 2021

(54) DRIVE MECHANISM AND SERVICE ROBOT HAVING THE SAME

(71) Applicants: Hyundai Motor Company, Seoul (KR); Kia Motors Corporation, Seoul (KR)

(72) Inventor: Hun Keon Ko, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 191 days.

(21) Appl. No.: 16/518,515

(22) Filed: Jul. 22, 2019

(65) Prior Publication Data

US 2020/0262084 A1 Aug. 20, 2020

(30) Foreign Application Priority Data

Feb. 19, 2019 (KR) .................... 10-2019-0019214

(51) Int. Cl.
*B25J 11/00* (2006.01)
*B25J 9/10* (2006.01)
*B25J 9/16* (2006.01)
*B25J 9/12* (2006.01)
*A47G 23/08* (2006.01)

(52) U.S. Cl.
CPC ............ *B25J 11/008* (2013.01); *B25J 9/102* (2013.01); *B25J 9/126* (2013.01); *B25J 9/1615* (2013.01); *B25J 9/1679* (2013.01); *A47G 23/08* (2013.01)

(58) Field of Classification Search
CPC ....... B25J 11/008; B25J 9/1679; A47G 23/08; A47G 23/06; A47G 23/02
See application file for complete search history.

(56) References Cited

U.S. PATENT DOCUMENTS

| 9,227,797 | B2* | 1/2016 | Yang | B25J 5/02 |
| 9,314,934 | B2* | 4/2016 | Whitney | B25J 19/002 |
| 9,827,677 | B1* | 11/2017 | Gilbertson | B25J 15/0014 |
| 2010/0100241 | A1* | 4/2010 | Jarisch | A47J 31/407 700/259 |
| 2012/0061155 | A1* | 3/2012 | Berger | B25J 5/007 180/21 |
| 2017/0144309 | A1* | 5/2017 | Sankai | B25J 9/0009 |

FOREIGN PATENT DOCUMENTS

| KR | 101637000 B1 | 7/2016 |
| KR | 101714505 B1 | 3/2017 |

* cited by examiner

*Primary Examiner* — Muhammad S Islam
*Assistant Examiner* — Devon A Joseph
(74) *Attorney, Agent, or Firm* — Mintz Levin Cohn Ferris and Popeo, P.C.; Peter F. Corless

(57) ABSTRACT

A service robot includes a robot body, a main post vertically mounted on the robot body, and at least one service unit provided on the main post to be movable vertically and to be rotatable, and including a service tool. The service unit includes a main plate that is disposed in an inner space of the main post, and a mounting member that is provided to be rotatable along an outer circumferential surface of the main post, and coupled to the main plate. The service tool is mounted on the mounting member, a vertical driving device is disposed in the inner space of the main post to move the main plate vertically, and a rotation driving device is installed on the main plate to rotate the mounting member.

11 Claims, 7 Drawing Sheets

DRIVE MECHANISM AND SERVICE ROBOT HAVING THE SAME

CROSS-REFERENCE TO RELATED APPLICATION

This application is claims the benefit of priority to Korean Patent Application No. 10-2019-0019214, filed on Feb. 19, 2019, the entire contents of which are incorporated herein by reference.

TECHNICAL FIELD

The present disclosure relates to a drive mechanism and a service robot having the same, and more particularly, to a drive mechanism that provides various services and a service robot having the same.

BACKGROUND

Robots, which are automatic machines that perform functions similar to human beings, may be classified into an industrial robot, a service robot, and a special-purpose robot based on purpose. Among them, the service robot provides various services, such as cleaning, article transporting, and beverage serving, which is different from the industrial robot for repeating simple tasks. Recently, robots have been used in various places such as hotels and restaurants.

In particular, a hotel provides a wide variety of services in a limited space, and thus a robot, which is able to perform many functions, is being used. For example, a service robot to be utilized for various purposes, such as article transporting, customer facing, or beverage serving, is used in rooms, lobby, and a banquet hall. However, conventional service robots have been mainly produced as only suitably for special purposes. Therefore, there is a need for a service robot being able to independently perform as many functions as possible.

SUMMARY

The present disclosure provides a drive mechanism, capable of installing service units in a desired number and independently controlling vertical movement and rotation of each service unit, and a service robot having the same. The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a service robot may include a robot body, a main post vertically mounted on the robot body, and at least one service unit disposed on the main post to be movable vertically and rotatable, and including a service tool. The service unit may include a main plate disposed in an inner space of the main post, a mounting member disposed to be rotatable along an outer circumferential surface of the main post, and coupled to the main plate, the service tool being mounted on the mounting member, an up-down driving device disposed in the inner space of the main post to move the main plate vertically, and a rotation driving device installed on the main plate to rotate the mounting member.

According to another aspect of the present disclosure, a drive mechanism for moving vertically and rotating a service tool installed on a main post may include a main plate disposed in an inner space of the main post, a mounting member provided to be rotatable along an outer circumferential surface of the main post and coupled to the main plate, the service tool being mounted on the mounting member, a vertical driving device disposed in the inner space of the main post to move the main plate vertically, and a rotation driving device installed on the main plate to rotate the mounting member.

As described above, according to the present disclosure, the service robot may include a plurality of service units, and thus, service tools performing various functions may be installed in one robot body. The service units may individually move vertically and rotate by the up-down driving device and the rotation driving device. Therefore, according to the present disclosure, various services may be provided in one hardware, and thus, utilization may be increased in a hotel or the like that provides various services in a limited space.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
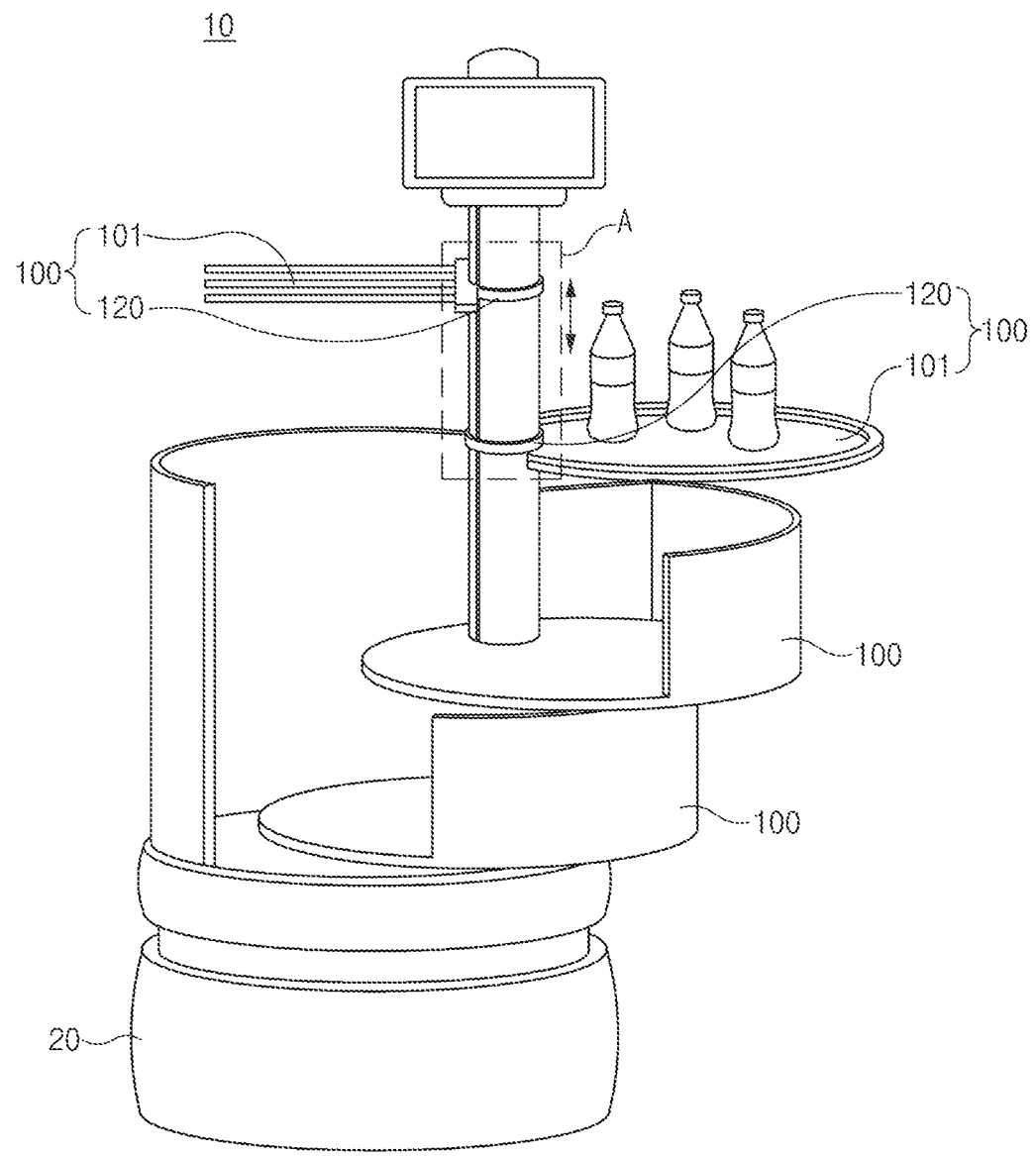
FIG. 1 is a perspective view illustrating a service robot, according to an exemplary embodiment of the present disclosure.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, an exemplary embodiment of the present disclosure will be described in detail with reference to the accompanying drawings.

First, the exemplary embodiments described below are appropriate to understand the technical features of a drive mechanism and a service robot having the same, which correspond to the present disclosure. However, the present disclosure is not limited to the following description of exemplary embodiments, or the technical features of the present disclosure are not limited by the exemplary embodiments, and various modifications are possible within the technical scope of the present disclosure.

Figure 2:
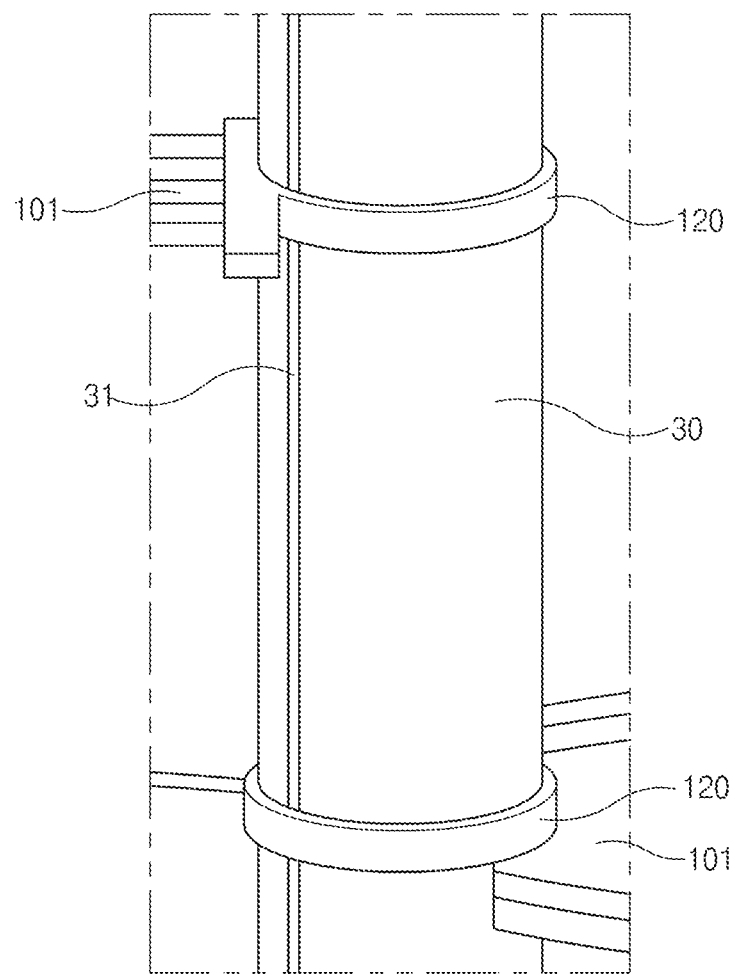
FIG. 2 is an enlarged perspective view illustrating part A of FIG. 1 according to an exemplary embodiment of the present disclosure.

Referring to FIGS. 1 and 2, according to an exemplary embodiment of the present disclosure, a service robot 10 may include a robot body 20, a main post 30, and a service unit 100. The robot body 20, of the service robot 10, may be installed at a specific location or provided to be movable as in the illustrated exemplary embodiment. The main post 30 may be mounted vertically on the robot body 20. For example, the main post 30 may have the shape of a cylinder having a hollow structure therein. The service unit 100 may be disposed on the main post 30 to allow the service unit 100 to move vertically and to be rotatable, and may include a service tool 101. A plurality of service units 100 may be provided.

In particular, the service tool 101 may be a tool for various functions, such as a cup holder function, a tray function, a monitor function, or the like, as in an example illustrated in FIG. 1. According the present disclosure, since the service robot 10 may include a plurality of service units 100 including service tools 101 having different functions as described above, various services may be provided in one hardware. In particular, the number of service units 100 may be determined based on the intention purpose of the service units.

Hereinafter, the structure of the service unit 100 will be described with reference to FIGS. 3 and 4. In other words, hereinafter, the mechanism of the vertical movement and the rotation of the service unit 100 will be described. The service unit 100 may include a main plate 110, a mounting member 120, a vertical driving device 130, and a rotation driving device 150. The main plate 110 may be disposed on the inner space of the main post 30. In particular, the main plate 110 may be formed in a disc shape and horizontally received on the inner space of the main post 30. However, the shape of the main plate 110 is not limited to the above.

The mounting member 120 may be mounted to be rotatable along the outer circumferential surface of the main post 30 and coupled to the main plate 110, and the service tool 101 may be mounted on the mounting member 120. In particular, the mounting member 120 may be provided in a ring shape and may be fitted around the main post 30. When the mounting member 120 is fitted around the main post 30, the mounting member 120 may be rotatable and movable vertically (e.g., up and down). The mounting member 120 may be coupled to the main plate 110 via a guide groove 31 formed through the main post 30 in a vertical direction.

The vertical driving device 130 may be disposed in the inner space of the main post 30 to move the main plate 110 vertically. Particularly, the mounting member 120 coupled to the main plate 110 may move vertically together with the main plate 110 when the main plate 110 moves vertically. The rotation driving device 150 may be installed on the main plate 110 to rotate the mounting member 120. In particular, the rotation driving device 150 may be disposed on the main plate 110 installed inside the main post 30 and may be configured to transmit rotational force to the mounting member 120 through the guide groove 31 to rotate the mounting member 120.

The present disclosure may further include a controller. The controller may be configured to automatically operate the vertical driving device 130 and the rotation driving device 150. As described above, according to the present disclosure, the service robot 10 may include a plurality of service units 100, thereby installing the service tools performing various functions in one robot body 20. Each of the service units 100 may individually move vertically and rotate by the vertical driving device 130 and the rotation driving device, 150 respectively. Therefore, according to the present disclosure, various services may be provided in one hardware, and thus, utilization may be increased in a hotel or other similar facility that provides various services in a limited space.

Figure 3:
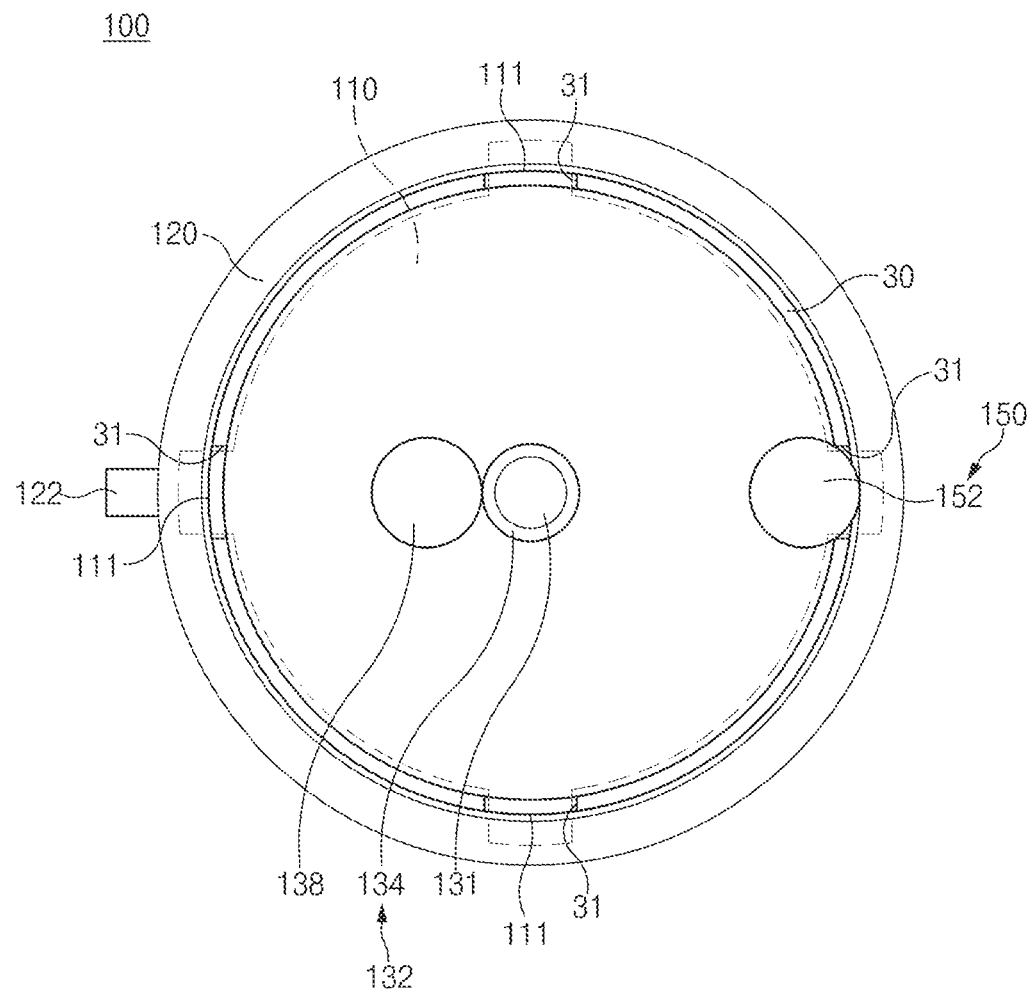
FIG. 3 is a top view illustrating a drive mechanism of the service robot, according to an exemplary embodiment of the present disclosure.
Figure 4:
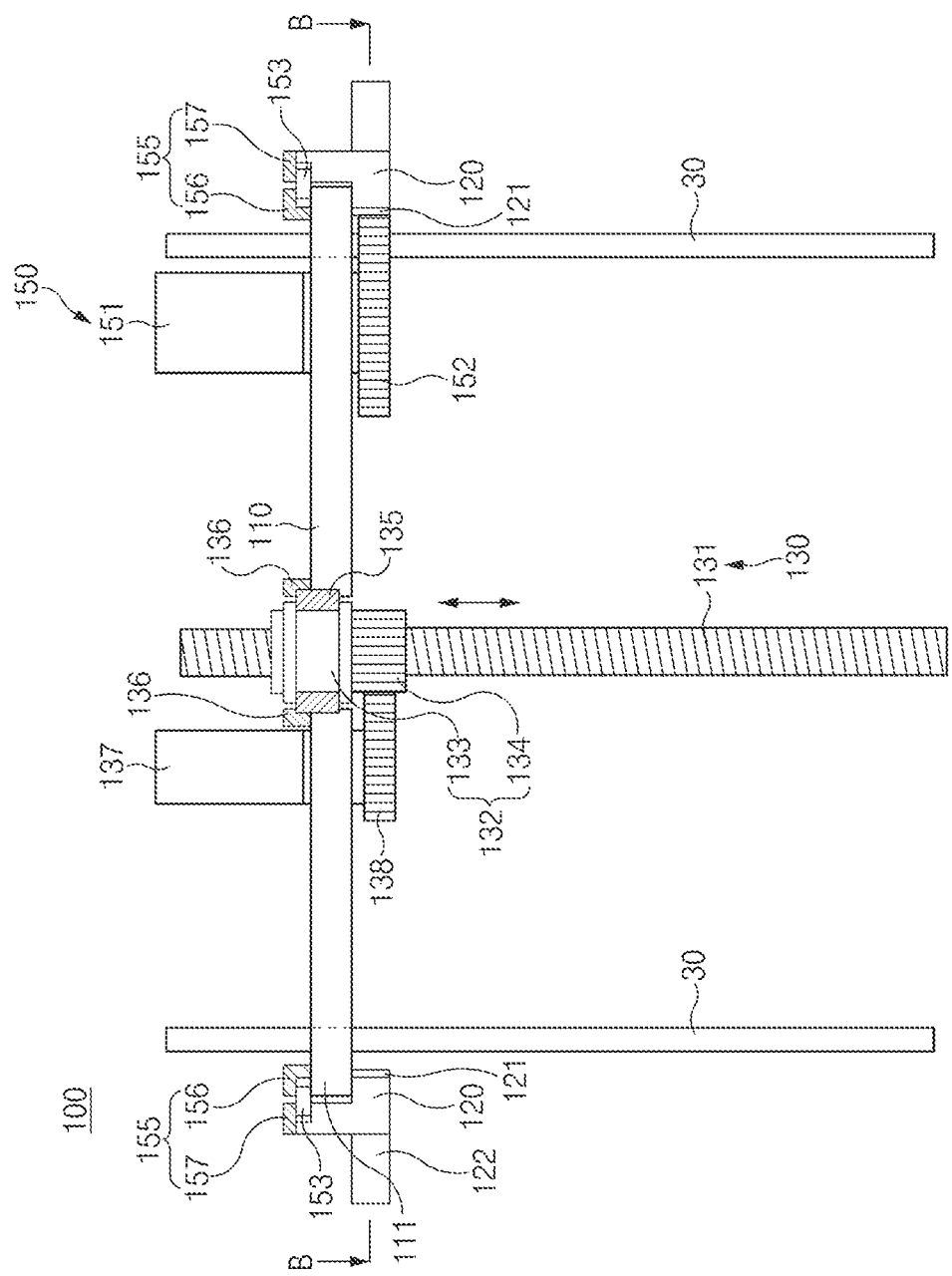
FIG. 4 is a side view illustrating the drive mechanism of the service robot, according to an exemplary embodiment of the present disclosure.

In particular, referring to FIGS. 3 and 4, the vertical driving device 130 may include a screw member 131, a lifting member 132, and a first driving motor 137. The vertical driving device 130 may further include a first bearing member 135. The screw member 131 may be mounted vertically in the inner space of the main post 30 and may pass through the main plate 110. In particular, the screw member 131 may be installed vertically at the center of the inner space of the main post 30, and may be fixed to the main post 30 or the robot body 20. A thread may be formed on the outer circumferential surface of the screw member 131.

The lifting member 132 may be interposed between the main plate 110 and the screw member 131, and may have an outer circumferential surface coupled to the main plate 110 and an inner circumferential surface screwed to the screw member 131 to move in the vertical direction along the screw member 131 in rotation. In particular, the lifting member 132 may be provided in the shape of a ring or a cylinder and may be fitted around the screw member 131. A thread may be formed on the inner circumferential surface of the lifting member 132 to be screwed to the screw member 131 having the thread formed on the outer circumferential surface of the screw member 131. The lifting member 132 may be configured to move in the longitudinal direction of the screw member 131 by the rotation to move the main plate 110 coupled to the lifting member 132 vertically.

A first driving motor 137 may be mounted on the main post 30 and may provide driving force for rotating the lifting member 132. A first bearing member 135 may be interposed between the lifting member 132 and the main plate 110 and thus, the lifting member 132 may be configured to rotate relative to the main plate 110. In particular, the lifting member 132 may include a passing-through part 133 and a nut part 134. The passing-through part 133 may pass through the main plate 110. The nut part 134 may be formed integrally with the passing-through part 133 and may include a gear tooth formed on the outer circumferential surface thereof to be engaged with a first driving gear 138 disposed in the first driving motor 137. As the nut member 134 is engaged with the first driving gear 138 to rotate, the lifting member 132 may move vertically along the screw member 131[gymin_bkl1].

In addition, the first bearing member 135 may have an inner race coupled to the passing-through part 133 and an outer race fixed to the main plate 110. The first bearing member 135 may be a roller bearing having an inner race, an outer race rotating relatively to the inner race, and a roller disposed between the inner race and the outer race. For example, the first bearing member 135 may be a cross roller bearing having cylindrical rollers orthogonal to each other between the inner and outer races. However, the type of the first bearing member 135 is not limited thereto, and various bearings may be applied as long as the bearings couple the lifting member 132 to the main plate 110 while permitting relative rotation.

The first bearing member 135 may be fixed to the main plate 110 by a center fixing member 136. In particular, the center fixing member 136 may be fixed to the outer race of the first bearing member 135 and may be fixed to the main plate 110. The main plate 110 may have a step formed on the inner circumferential surface of the aperture through which the passing-through part 133 passes, and protruding steps may be formed on upper and lower ends of the passing-through part 133. The first bearing member 135 may be supported by the protruding steps of the passing-through part 133 and the step of the main plate 110. The type and the fixing manner of the center fixing member 136 are not limited. For example, the center fixing member 136 may be fixed to the first bearing member 135 and the main plate 110 through assembling or by an adhesive.

Meanwhile, the main post 30 may include the guide groove 31 longitudinally formed through the main post in the vertical direction. The main plate 110 may include a protrusion 111 that protrudes out of the main post 30 through the guide groove 31 to guide the vertical-direction movement of the main plate 110. In particular, the guide groove 31 may be formed longitudinally in the main posts 30 in the vertical direction, and a plurality of guide grooves 31 may be provided based on the number of the protrusions 111. The main plate 110 may move vertically in the state that the protrusion 111 protrudes through the guide groove 31. In other words, the main plate 110 may be guided by moving vertically when the protrusion 111 is inserted into the guide groove 31.

Additionally, the rotation driving device 150 may include a second driving motor 151. The second driving motor 151 may be mounted on the main plate 110 and may include a second driving gear 152. The mounting member 120 may have an internal gear tooth 121 engaged with the second driving gear 152 to receive the driving force of the second driving motor 151 and to rotate. In particular, the mounting member 120 may be disposed on the protrusion 111, and the internal gear tooth 121 may be engaged with the second driving gear 152 (not illustrated) exposed to the outside of the main post 30 through the guide groove 31.

In other words, the mounting member 120 may be provided in the form of an internal gear, and the internal gear tooth 121 formed on the inner circumferential surface of the mounting member 120, which faces the main post 30, may be engaged with the second driving gear 152 of the second driving motor 151, and thus, the mounting member 120 may rotate. The internal gear tooth 121 and the second driving gear 152 may be engaged with each other through the guide groove 31.

Furthermore, the mounting member 120 may be installed on the protrusion 111 and may be coupled to the main plate 110 while permitting relative rotation. In particular, the rotation driving device 150 may further include a second bearing member 153. The second bearing member 153 may be interposed between the mounting member 120 and the main plate 110 and thus, the mounting member 120 may be configured to rotate relative to the main plate 110. The rotation driving device 150 may further include a fixing part 155 configured to fix the second bearing member 153 to the main plate 110 and the mounting member 120. The fixing part 155 may include a first fixing member 156 and a second fixing member 157.

The first fixing member 156 may be coupled to the inner race of the second bearing member 153 and fixed to the main plate 110. The second fixing member 157 may be coupled to the outer race of the second bearing member 153 and fixed to the mounting member 120. Further, the mounting member 120 may include a step to support the second bearing member 153. The fixing manner and the types of the first fixing member 156 and the second fixing member 157 are not limited, and various manner and various types may be applied as long as the mounting member 120 is coupled to the main plate 110 while permitting relative rotation.

The second bearing member 153 may be a roller bearing having an inner race, an outer race, and a roller disposed between the inner race and the outer race. In particular, the second bearing member 153 may be a cross roller bearing having cylindrical rollers orthogonal to each other between the inner and outer races. The second bearing member 153 may endure a load in the axial direction of the screw member 131 to mount the mounting member 120 and a load in the direction orthogonal to the axis acting upon rotation of the mounting member 120. However, the type of the second bearing member 153 is not limited thereto. Meanwhile, the mounting member 120 may include an adapter member 122 that protrudes from the outer circumferential surface thereof such that the service tool 101 is coupled to the mounting member 120. The service tool 101 may be coupled by the adapter member 122.

Figure 5A:
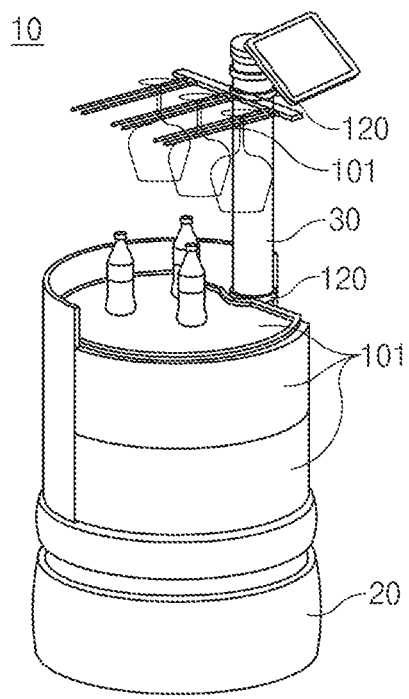
FIG. 5A is a view illustrating that the service robot performs a room service of a hotel, according to an exemplary embodiment of the present disclosure.
Figure 5B:
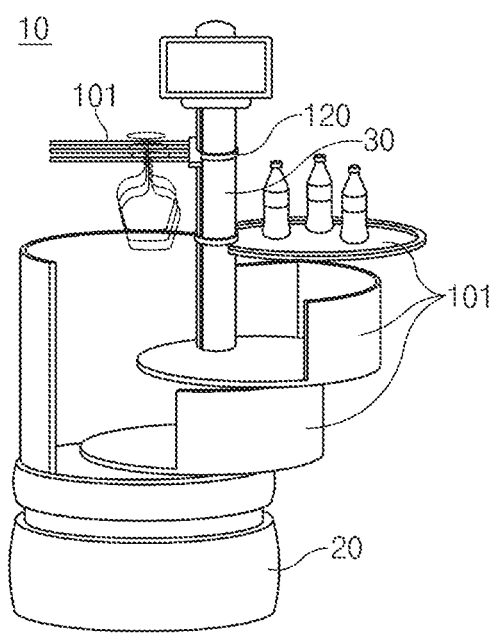
FIG. 5B is a view illustrating the operating state of the service robot, according to an exemplary embodiment of the present disclosure.
Figures 6A, 6B:
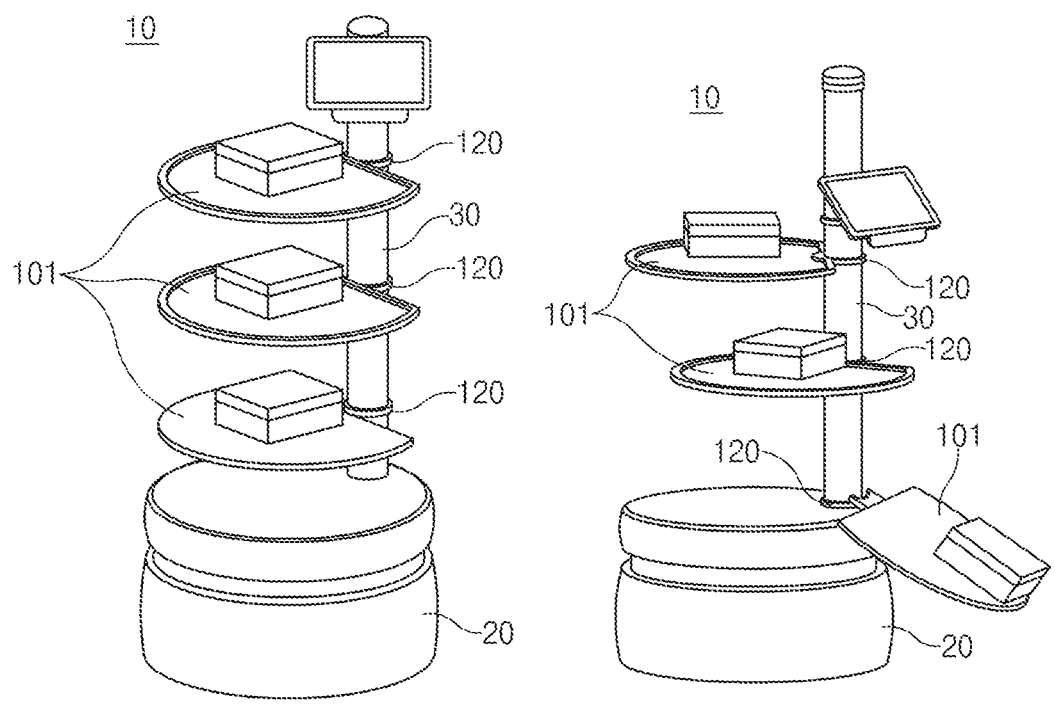
FIG. 6A is a view illustrating that the service robot performs a lobby service of a hotel, according to an exemplary embodiment of the present disclosure.
FIG. 6B is a view illustrating the operating state of the service robot according to an exemplary embodiment of the present disclosure.
Figure 7A:
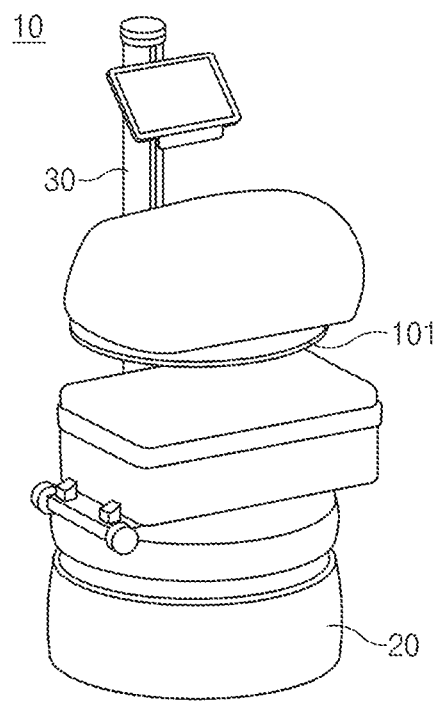
FIG. 7A is a view illustrating that the service robot performs a banquet hall service of the hotel, according to an exemplary embodiment of the present disclosure.
Figure 7B:
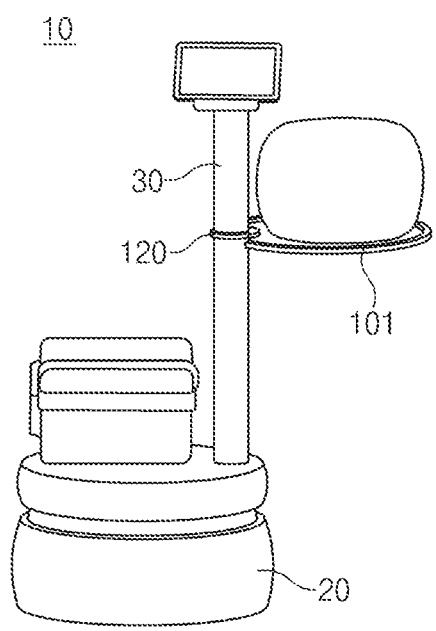
FIG. 7B is a view illustrating the operating state of the service robot according to an exemplary embodiment of the present disclosure.

FIGS. 5A to 7B illustrate exemplary embodiments where the service robot 10 is installed in various spaces of a hotel to provide various services. FIGS. 5A and 5B are views illustrating that the service robot 10 may be configured to perform for a room service of the hotel, according to the present disclosure. FIGS. 6A and 6B are views illustrating that the service robot 10 may be configured to perform at a lobby service of the hotel, according to the present disclosure. FIGS. 7A and 7B are views illustrating that the service robot 10 may be configured to perform at a banquet hall service of the hotel, according to the present disclosure.

As described above, according to the present disclosure, the service robot 10 may be configured to perform various functions in one hardware having one drive mechanism. Meanwhile, according to the present disclosure, the drive mechanism is based on moving vertically, and rotating the service tool 101 installed on the main post 30. The drive mechanism may include the main plate 110 disposed in the inner space of the main post 30, the mounting member 120 mounted to be rotatable along the outer circumferential surface of the main post 30 and coupled to the main plate 110, the service tool 101 being mounted on the mounting member 120, the vertical driving device 130 disposed in the inner space of the main post 30 to the main plate 110 vertically, and the rotation driving device 150 may be installed on the main plate 110 to rotate the mounting member 120.

As described above, according to the present disclosure, the service robot may include a plurality of service units, so service tools performing various functions may be installed in one robot body. The service units may individually move vertically and rotate by the vertical driving device and the rotation driving device, respectively. Therefore, according to the present disclosure, various services may be provided in one hardware, and thus, utilization may be increased in a hotel or similar facility that provides various services in a limited space.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A service robot, comprising:
    a robot body;
    a main post mounted vertically on the robot body; and
    at least one service unit disposed on the main post to be movable vertically and to be rotatable, and including a service tool,
    wherein the service unit includes:
        a main plate disposed in an inner space of the main post;
        a mounting member provided to be rotatable along an outer circumferential surface of the main post, and coupled to the main plate, wherein the service tool is mounted on the mounting member;
        a vertical driving device disposed in the inner space of the main post to move the main plate vertically; and
        a rotation driving device installed on the main plate and connected to the mounting member by a gear to provide a driving force for rotating the mounting member,
    wherein the vertical driving device includes:
        a screw member mounted vertically in the inner space of the main post and passing through the main plate;
        a lifting member interposed between the main plate and the screw member, and having an outer circumferential surface coupled to the main plate and an inner circumferential surface screwed to the screw member to move in a vertical direction along the screw member in rotation; and
        a first driving motor mounted on the main post and configured to provide driving force for rotating the lifting member, and
    wherein the lifting member includes:
        a passing-through part passing through the main plate; and
        a nut part integrally formed with the passing-through part, having a gear tooth formed on an outer circumferential surface of the nut part, and engaged with a first driving gear disposed in the first driving motor.

2. The service robot of claim 1, further comprising:
    a controller configured to operate the vertical driving device and the rotation driving device.

3. The service robot of claim 1, wherein the vertical driving device further includes:
    a first bearing member interposed between the lifting member and the main plate to rotate the lifting member relative to the main plate.

4. The service robot of claim 3,
    wherein the first bearing member has an inner race coupled to the passing-through part and an outer race fixed to the main plate.

5. The service robot of claim 1, wherein the main post includes:
    a guide groove formed longitudinally through the main post in a vertical direction.

6. The service robot of claim 1, wherein the rotation driving device includes:
    a second driving motor mounted on the main plate and having a second driving gear,
    wherein the mounting member has an internal gear tooth engaged with the second driving gear to receive driving force of the second driving motor and to rotate.

7. The service robot of claim 6, wherein the main post includes:
    a guide groove formed longitudinally through the main post in a vertical direction,
    wherein the main plate includes a protrusion that protrudes out of the main post through the guide groove,
    wherein the mounting member is disposed on the protrusion, and
    wherein the internal gear tooth is engaged with the second driving gear exposed out of the main post through the guide groove.

8. The service robot of claim 7, wherein the rotation driving device further includes:
    a second bearing member interposed between the mounting member and the main plate to rotate the mounting member relative to the main plate.

9. The service robot of claim 8, wherein the rotation driving device further includes:
    a fixing part that fixes the second bearing member to the main plate and the mounting member,
    wherein the fixing part includes:
    a first fixing member coupled to an inner race of the second bearing member and fixed to the main plate; and
    a second fixing member coupled to an outer race of the second bearing member and fixed to the mounting member.

10. The service robot of claim 1, wherein the mounting member includes:
    an adapter member that protrudes from an outer circumferential surface of the mounting member to couple the service tool to the mounting member.

11. A drive mechanism for moving vertically and rotating a service tool installed on a main post, comprising:
- a main plate disposed in an inner space of the main post;
- a mounting member provided to be rotatable along an outer circumferential surface of the main post and coupled to the main plate, wherein the service tool is mounted on the mounting member;
- a vertical driving device disposed in the inner space of the main post to move the main plate vertically; and
- a rotation driving device installed on the main plate and connected to the mounting member by a gear to provide a driving force for rotating the mounting member, wherein the vertical driving device includes:
- a screw member mounted vertically in the inner space of the main post and passing through the main plate;
- a lifting member interposed between the main plate and the screw member, and having an outer circumferential surface coupled to the main plate and an inner circumferential surface screwed to the screw member to move in a vertical direction along the screw member in rotation; and
- a first driving motor mounted on the main post and configured to provide driving force for rotating the lifting member, and wherein the lifting member includes:
- a passing-through part passing through the main plate; and
- a nut part integrally formed with the passing-through part, having a gear tooth formed on an outer circumferential surface of the nut part, and engaged with a first driving gear disposed in the first driving motor.

* * * * *